Patented May 6, 1941

2,241,251

UNITED STATES PATENT OFFICE 2,241,251

PROCESS FOR COLORING PLASTIC MATERIALS

Ernest M. Franklin, Kingsport, Tenn., assignor to Eastman Kodak Company, Rochester, N. Y., a corporation of New Jersey No Drawing. Application June 3, 1937, Serial No. 146,290

1 Claim. (Cl. 106—40)

This invention relates to coloring thermoplastic molding materials and more particularly to an improved process and composition for coloring uncolloidized cellulose organic derivative thermoplastic molding materials and for subsequently colloidizing the colored materials.

Various methods have been heretofore employed to color thermoplastic materials. Certain of these methods employ varying quantities of easily volatile solvents, for example acetone, in which the coloring material is mixed or dissolved, and this mixture or solution is then added to the thermoplastic base material to distribute the coloring matter throughout the base material. If the composition is to be employed for forming molded articles, the content of such solvents must be reduced by suitable processes and these processes include steps such as solvent recovery, heating and prolonged curing and, all in all, involve considerable expense in time, storage space, multiple handling, in addition to the cost of the solvent. Also, if the molded article is made by such solvent processes, the time required to lower the solvent content prevents rapid delivery of the molded article on receipt of an order for it. The most important consideration, however, is not the expense connected with the cost of the solvent or its elimination and recovery, but it is the fact that, in most cases, sufficient solvent remains in the plastic to produce considerable swelling and puffing up of the material, and to form large quantities of gas or vapor which, on processing and molding under heat and pressure, form gas pockets and this often results in a porous plastic material having a low density. Furthermore, even molding such material under heat and pressure does not drive off all the solvent and, in most cases, sufficient residual solvent remains in the plastic to cause the finished molded article to warp or cause color exudation.

Another method of coloring uncolloidized cellulose organic derivative materials whereby the introduction of low boiling solvents is avoided is disclosed in Wood Patent No. 1,966,327 of July 10, 1934. As described in this patent, coloring materials, such as spirit-soluble dyes, are mixed into a plasticizer for an uncolloidized cellulose organic derivative material and the dyed plasticizer is then mixed with the uncolloidized cellulose derivative base material. The base cellulosic material is preferably in the form of molding powders which consist of particles of uncolloidized comminuted dry cellulose organic derivatives.

While this method is particularly satisfactory for coloring cellulose organic derivatives with spirit-soluble dyes, a more versatile process, which takes less time to complete and by which accurate control of color both as to shade and mixture can be attained, is desirable. It is also preferable that such a process be adaptable for coloring, not only with dyes but also with lakes, pigments and metallic powders or mixtures thereof.

Furthermore, it is desirable to have at hand various color concentrate materials which may be stored and used when convenient, and which, owing to their inherent characteristics, do not permit agglomeration or settling of the color bodies.

An object, therefore, of the present invention is an improved process for coloring thermoplastic materials suitable for molding, such as uncolloidized cellulose organic derivatives or other cellulose derivative thermoplastic molding compounds, thermoplastic resins and the like, with dyes, pigments, lakes and metallic powders or mixtures thereof.

Another object of the invention is a moistureproof colored cellulose derivative concentrate which may be employed to color a cellulose organic derivative plastic material.

A further object of the invention is an improved method of coloring an uncolloidized cellulose organic derivative with a colloidized colored organic derivative plastic concentrate material having the color bodies in a homogeneously dispersed colloidal suspension therein.

In accordance with the invention, these and other objects are attained by forming a colloidized cellulose organic plastic colored concentrate containing one or more cellulose organic derivatives and color bodies, such as dyes, lakes, pigments and metallic powders in homogeneous colloidal suspension therein, which concentrate is soluble in the plasticizer for the thermoplastic material to be colored, and adding a part of the colored concentrate thereto with suitable mixing.

In preparing the concentrate containing the coloring matter, preferably I employ mixed hydrolyzed cellulose organic acid esters, such as cellulose acetate-propionate and cellulose acetate-butyrate which, when mixed with such plasticizers as diamyl phthalate, dibutyl phthalate and tripropionin will dissolve at approximately room temperature in the plasticizer which is used in making up the base composition to be colored. The base composition to be colored is preferably of a base such as hydrolyzed cellulose acetate, cellulose acetate-propionate or cellulose acetate-butyrate and the plasticizer is preferably tripropionin. The preferred coloring materials are titanium dioxide and alizarine red.

While I prefer to employ the above-named cellulose organic acid esters in the concentrate and in the colored molded composition, I may also employ cellulose acetate, cellulose propionate, cellulose butyrate, cellulose acetate-butyrate, cellulose acetate-propionate, cellulose acetate-propionate-butyrate, cellulose acetate-stearate and cellulose acetate-laurate.

Furthermore, I prefer to employ the foregoing compounds which are within definite ranges of esterification as follows: Cellulose acetate 37 to 40½% acetyl; cellulose propionate 48 to 51% propionyl; cellulose butyrate 47 to 57% butyryl; cellulose acetate-propionate 1% to 19% acetyl and 30 to 50% propionyl; cellulose acetate-butyrate 1 to 31% acetyl and 18 to 56% butyryl; cellulose acetate-propionate-butyrate 18 to 31% acetyl, 1 to 18% butyryl, 1 to 31% propionyl; cellulose acetate-stearate 1 to 33% acetyl and 20 to 82% stearyl; cellulose acetate-laurate 1 to 30% acetyl and 25 to 76½% lauryl. These percentages are based on the total amount of esterification.

For the solvent type of plasticizers which I prefer to use, such as dimethyl phthalate, etc., I prefer to employ the foregoing compounds which are within definite ranges of esterification as follows: cellulose propionate 43½ to 51½% propionyl, cellulose butyrate 42 to 57½% butyryl, cellulose acetate-propionate 1 to 42% acetyl and 1 to 50% propionyl, cellulose acetate-butyrate 1 to 42% acetyl and 1 to 56% butyryl.

The acetate propionate ester containing less than 17% propionyl as the fully esterified ester should be hydrolyzed to suitable solubility. The acetate-butyrate esters containing less than 15% butyryl as the fully esterified ester should be hydrolyzed to suitable solubility.

The cellulose esters employed in the colored concentrate contain a sufficient amount of ester groups to enhance their solubility in the plasticizers used. However, cellulose esters having different degrees of hydrolization can be employed since, with the large number of plasticizers which can be used in my coloring process, a large number of solubility effects can be obtained by changing the complexity of the cellulose ester and thereby effect its solubility in these plasticizers with equal desirable results. The degree of hydrolization of the cellulose ester base materials may also vary widely with equally desirable results, depending upon, of course, the choice of plasticizer.

While I may employ cellulose esters of any suitable viscosity, I have found that viscosities of 150 seconds and less are preferable. This viscosity is determined by dissolving one part of the ester in four parts of acetone and determining the time in seconds required for a $\frac{1}{16}$ inch steel ball to drop thru 10 inches of the solution in a tube 1 inch in diameter at a temperature of 20° C.

I have found that cellulose nitrate may also be used in preparing the concentrate with tripropionin. If the concentrate made from the cellulose nitrate material be used with a cellulose acetate base, the material would have to be very highly concentrated with a large amount of dye, so that a minimum amount would be required and compatability with the cellulose acetate assured.

I may also employ in the colored concentrate and in the cellulose base composition other plasticizers, such as benzyl benzoate, tripropionin, diethylene glycol mono-ethyl ether, diethylene glycol mono-butyl ether, dibutyl tartrate, methoxy ethyl phthalate, ethoxy ethyl phthalate, dimethyl phthalate, diethyl phthalate and mixtures thereof, such as 25 to 50% dimethyl phthalate to 50 to 75% diethyl phthalate, triphenyl phosphate, triacetin, diamyl phthalate and ortho-cresyl para-toluene sulfonate.

The concentrate may contain other pigments, such as antimony oxide, barium sulphate, lead carbonate, zinc oxide, magnesium silicate; pigment lakes such as cadmium sulfide, chromium oxides, Prussian blue, chrome yellows; dyes such as Heliogen blue, Sudan blue and Rhodamines; and metallic powders such as aluminum powder, bronze powder; and effect materials such as pearl essence.

It will be understood that various mixtures and combinations of the above-mentioned cellulose esters, colored concentrates and coloring materials may be suitably employed in accordance with the present invention.

In the following examples, I have set forth two of the preferred embodiments of my invention which are included merely for the purposes of illustration and not as limitations:

*Example 1*

100 parts of finely divided cellulose acetate-propionate having approximately a 30% propionyl content are mixed with 50 parts of dibutyl phthalate, 50 parts of titanium dioxide and 50 parts of alizarine red.

The mixture is then subjected to kneading between a pair of heated milling rolls, such as disclosed in Conklin Patent No. 2,046,686 of July 28, 1936, until entirely homogeneous. Both rolls may be driven or only one roll. Heat is supplied to the rolls by means of steam, water or oil as well known in the art with such apparatus. The heating fluid is introduced through pipes suitably journaled or packed in the end of the rolls, which rolls are mounted on the usual bearings. A satisfactory method of heating the rolls is by using steam and a pressure of from 40# to 150# of steam works well. One of the rolls (preferably the idler roll, if only one is driven) is on an adjustable axis, so that the gap through which the material must pass, may be varied to correspondingly vary the pressure applied to the material during the kneading operation. Preferably, as pointed out in the copending Conklin application Serial No. 106,079½, one of the rolls, if only one is driven, the driven roll is heated at a higher temperature than the other so that the material will adhere thereto. As stated in the Conklin application, if the large proportion of coloring agents is employed in the composition, the heat differential between the rolls should be increased. In making the above composition, I have found that a differential of approximately 10° F. will permit the plastic composition to accumulate on the hotter roll in a uniform layer.

Preferably the hotter roll is not only approximately 10° higher than the other roll, but it should preferably be above 212° F. for this will also assure that the moisture content of the composition will be reduced below .5%, as pointed out in the copending Conklin application Serial No. 91,370, filed July 18, 1936 now U. S. Patent 2,155,303 of April 18, 1939. As stated in that application, by colloidizing a plasticized cellulose ester containing coloring matters on such heated rolls, the moisture will be reduced below .5% and a product of uniform density, tensile strength and toughness will result.

Furthermore, owing to the internal shearing action of the agglutenated doughy plastic materials on the rolls, the pigments, dyes, lakes, etc., are broken down into extremely fine particles and, consequently, a given amount of coloring material will exhibit its coloring effect more than if it has not been so subdivided. The working of the agglutenized composition is continued for approximately 5 to 20 minutes and, since there is a tendency for the coloring material to work away from the center of the rolls, strips of the layer are cut off the rolls near the edges and are lapped over, so that they will be worked in the center of the rolls and be homogeneously dispersed in the plastic mass. I have found that, by this rolling procedure, the coloring material will be finely divided to at least unit particle size and will be thoroughly dispersed in the plastic composition. Since none of the components in the composition are volatile, a homogeneous, easily duplicable, composition is made. Furthermore, the plasticity of the composition can be predetermined before the rolling operation and will remain substantially at the same plasticity during the whole rolling operation which insures the production of uniformly sized colored particles.

The hot colloidized sheet of colored concentrate composition which is formed on the hot roll is stripped therefrom and ground up or otherwise subdivided into a uniformly colored fine powder in any suitable apparatus. The granular material thus produced contains finely divided coloring materials and is a particularly valuable form of molding composition, since each of its graules is a sealed agglomerate of smaller particles, homogeneously welded together in a unit. As the moisture has already been reduced to a substantial negligible minimum and the plasticized colored cellulose ester is thoroughly colloidized by the combined action of heat and pressure on the rolls, there results a colored colloidized material, effectively sealed against the inter-penetration or absorption of moisture. The material is thus protected against deterioration and, since sufficient moisture does not collect on the surface of the granule to adversely affect its use in molding, there results moisture-free granules which are always ready for immediate use.

The granulated colloidized colored concentrate may now be employed to color uncolloidized cellulose ester granules:

An example of a typical base plastic composition, which can be colored in accordance with the invention by the above described colored concentrate is one containing the following:

| | Parts |
|---|---|
| Finely divided uncolloidized cellulose acetate | 100 |
| Tripropionin | 45 |

The above-described colored concentrate is added to the 45 parts of tripropionin, in which it is soluble at room temperature. It is desirable that this concentrate be soluble to form a very thin dope in the plasticizer at moderate temperature. If desired, the mixture may be heated moderately and stirred in any suitable apparatus to promote the solubility of the concentrate in the plasticizer. When the colored concentrate is in good solution in the tripropionin and thoroughly distributed therein, this solution is mixed with the finely ground uncolloidized cellulose acetate. This mixing may be conducted in any suitable mixer, such as a Werner and Pflieder mixer, for a period sufficient to homogeneously mix the colored plastic concentrate throughout the cellulose acetate. In general, this mixing will be within the range of 15 to 180 minutes.

The quantity of concentrate which is added to the 45 parts of tripropionin will depend primarily on the color desired in the finished plastic.

A plastic composition containing:

| | Parts |
|---|---|
| Cellulose acetate | 100 |
| Tripropionin | 45 |
| Colored concentrate | 1 | will be of a very attractive pastel color.

*Example 2*

In accordance with another example of the invention, instead of forming a concentrate containing both colored pigments and dyes, two or more component concentrates may be made up separately into colloidized colored granules, one for the dye and the other for the pigments and then suitable proportions of these can be put into solid solution in the plasticizer for the main composition. For instance, a pigmented concentrate may be formed by colloidizing 50 parts of cellulose acetate on the heated milling rolls with 25 parts of dibutyl phthalate and 25 parts of titanium dioxide and then granulated to form the colored concentrate powder.

Similarly, a dyed colored concentrate may be formed by colloidizing 50 parts of cellulose acetate on the heated milling rolls with 25 parts of dibutyl phthalate and 25 parts of alizarine red and then granulating.

Suitable proportions of these two concentrations may then be added, as heretofore described, to form a solution in the plasticizer for the base composition, depending on the color or shade desired, after which the solution is mixed with the uncolloidized cellulose acetate particles to impart the color thereto.

The uncolloidized particles colored by either of the above described methods may then be molded into a colloidized molded article in an open mold by placing a suitable amount of the colored uncolloidized particles in the mold and heating while exerting a pressure thereon, as is well known in the art. These uncolloidized colored particles are also suitable for injection molding and may be colloidized by the heat and pressure employed in such processes.

I have also found that my improved process for coloring uncolloidized cellulose organic derivatives is applicable to coloring cellulose organic ethers, such as methyl cellulose, ethyl cellulose and benzyl cellulose. Preferably, however, the base cellulose material for both the color concentrate and main composition should be a cellulose ether.

My improved process is also adaptable to color thermoplastic resins, such as Formvar, a polyvinyl formaldehyde acetal resin, and may be plasticized with such plasticizers as heretofore mentioned or other plasticizers, such as:

Trimethoxyacetin
 Ethylene glycol dimethoxyacetate
 Diethylene glycol dimethoxyacetate
 Triethylene glycol dimethoxyacetate
 Propylene glycol dimethoxyacetate
 Ethylene glycol dilactate
 Diethylene glycol dilactate
 Tetrahydrofurfuryl lactate
 Triethyl citrate
 Diethoxyethyl maleate
 Ditetrahydrofurfuryl maleate
 Dimethoxyethyl succinate
 Diethoxyethyl succinate
 Ditetrahydrofurfuryl succinate
 Dimethoxyethyl adipate
 Di(diglycol monoacetate)succinate
 Diethoxyethyl adipate
 Ethoxyethyl benzoate
 N,N-dibutyl acetamide
 N-N butyl diacetamide
 Acetoacetamide
 N-n butyl dipropionate.

In addition to "Formvar" resins, other resins such as the "Alvars" vinyl acetate, vinyl chloride, polystyrene, acrylate and methacrylate resins may be colored by incorporating a suitable colored concentrate in a suitable plasticizer for these resins in accordance with my invention.

By my improved process, I can uniformly color thermoplastic compositions and, subsequently, duplicate their color. The thermoplastic composition may then be colloidized in suitable molds under heat and pressure.

The colored concentrates are in the form of granules which are sealed against the penetration of moisture. Owing to the hot rolling and internal friction of the plastic on the included color bodies, the color bodies are present therein in finely divided particles. They are held in colloidal suspension in the granules and can not reagglomerate. Consequently, the granules may be stored in suitable containers and employed as desired. Moreover, by reducing the moisture content of the concentrate on the heated rolls to a negligible quantity, substantially no moisture is introduced into the mold, since the concentrate granules are impenetrable to moisture. The thermoplastic particles may be also dried on heated pans or by other suitable methods to reduce the moisture therein to a negligible quantity.

Instead of employing uncolloidized cellulosic particles as the base composition to be colored, the invention is applicable to coloring previously colloidized cellulose esters and ethers or thermoplastic resins, which may or may not contain filling and coloring materials.

Different colored granules may be mixed together and employed to color the thermoplastic particles. Furthermore, by employing a concentrate which is easily soluble in the plasticizer for the base composition, I have been able to employ dyes, pigments, lakes and the like, alone or in combination, to color thermoplastic materials. The molded articles made from these materials is characterized in that it contains no volatile solvents which tend to warp and shrink the article and in that it has an absolutely even color without streaks or segmented portions.

What I claim is:

The method of forming a volatile solvent-free colored thermoplastic molding composition which comprises hot rolling on milling rolls an agglutinized mixture of a volatile solvent-free cellulose organic acid ester with a plasticizer and colored pigment materials to form a color concentrate composition whereby the color particles are broken down into discrete particles, thoroughly mixing a desired amount of this composition in a plasticizer for the base material from which the molded article is made and homogeneously dispersing the colored plasticizer in the base material until a uniformly colored product is obtained.

ERNEST M. FRANKLIN.